United States Patent [19]
Gray

[11] 3,749,332
[45] July 31, 1973

[54] SPACE VEHICLE WITH ARTIFICIAL GRAVITY AND EARTH-LIKE ENVIRONMENT

[75] Inventor: Vernon H. Gray, Bay Village, Ohio

[73] Assignee: The United States of America as represented by the Administration of the National Aeronautics and Space Administration, Washington, D.C.

[22] Filed: Aug. 30, 1971

[21] Appl. No.: 175,983

[52] U.S. Cl............................ 244/1 SC, 47/1.4, 47/17, 244/1 SS
[51] Int. Cl.............................................. B64g 1/00
[58] Field of Search............... 244/1 SA, 1 SC, 1 SS; 47/1.4, 17; 350/288, 293, 299, 310

[56] References Cited
UNITED STATES PATENTS

| R26,887 | 5/1970 | McLean | 244/1 SA |
|---|---|---|---|
| 1,514,653 | 11/1924 | Cardwell | 350/293 |
| 2,325,765 | 8/1943 | Gartenmeister | 350/310 |
| 3,053,476 | 9/1962 | Mohar | 244/1 SS |
| 3,158,337 | 11/1964 | Lannan | 244/1 SS X |
| 3,303,608 | 2/1967 | Hannan | 47/1.4 |
| 3,358,944 | 12/1967 | Ule | 244/1 SA |
| 3,362,104 | 1/1968 | Oswald et al. | 47/1.4 |
| 3,420,739 | 1/1969 | Bongers et al. | 47/1.4 |
| 3,488,504 | 1/1970 | Lowen et al. | 244/1 SA X |
| 3,576,298 | 4/1971 | Barnett et al. | 244/1 SS |

*Primary Examiner*—Milton Buchler
*Assistant Examiner*—Barry L. Kelmachter
*Attorney*—N. T. Musial, John R. Manning et al.

[57] ABSTRACT

A space vehicle adapted to provide an artificial gravity and earthlike atmospheric environment for occupants is disclosed. The vehicle comprises a cylindrically-shaped, hollow pressure-tight body one end of which is tapered from the largest diameter of the body, the other end being flat and transparent to sunlight. The vehicle is provided with thrust means which rotates the body about its longitudinal axis, generating an artificial gravity effect upon the interior walls of the body due to centrifugal forces. Sunlight is directed into the interior of the body through the transparent end by means of a mirror which is oriented independently of the rotation of the body. The sunlight is dispersed to the internal surfaces of the body by means of a structure of concentric reflecting and deflecting rings. The walls of the tapered end of the body are maintained at a temperature below the dew point of water vapor in the body and lower than the temperature near the transparent end of the body. Due to the temperature differential between the two ends and rotation of the body, warm air and water vapor flow from near the transparent end towards the longitudinal axis of the body and towards the tapered end. The water vapor condenses on the walls of the tapered end and due to centrifugal force flows back towards the transparent end along the walls of the body. The cooled air flows back towards the transparent end adjacent the walls of the body. The walls of the body are lined with soil and provided with an initial supply of plants and livestock. Because of the controlled climate and sunlight, an earthlike environment is maintained wherein the carbon dioxide/oxygen balance is maintained, and food for the travelers is supplied through natural system of plant life which can be maintained in the spacecraft. Waste products are treated hygienically and returned to the soil to serve as fertilizers. A pleasant earthlike environment is provided for space travelers on voyages of years or possibly decades in duration.

10 Claims, 1 Drawing Figure

PATENTED JUL 31 1973 3,749,332
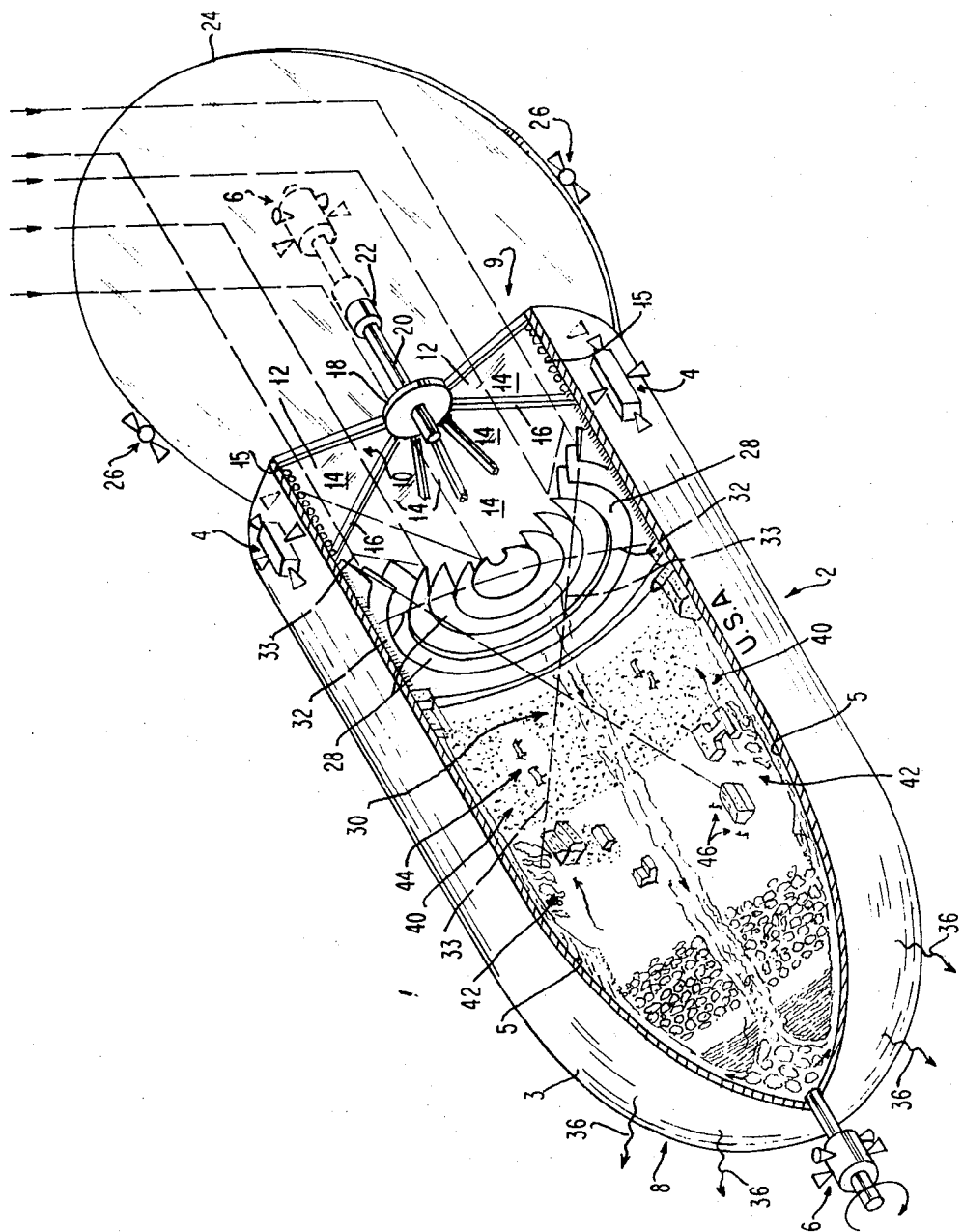
INVENTOR
VERNON H. GRAY
BY Norman T. Musial
James A. Mackin
ATTORNEYS

SPACE VEHICLE WITH ARTIFICIAL GRAVITY AND EARTH-LIKE ENVIRONMENT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates to space vehicles which are intended to operate outside of the earth's atmosphere in gravity-neutralized flight for extended periods of time. Such space vehicles are envisioned for use as earth-orbiting bases or for interplanetary journeys which will require travel times of months or years. The occupants of spacecraft on such flights are generally free of any appreciable weight effects of earth gravity or from other planetary bodies. Up to the present, the weightlessness experienced by travelers on space flights has not resulted in any serious physiological or psychological difficulties. Flights to date have been of relatively short duration compared to the duration of interplanetary flights or the duration of the time which an earth-orbiting laboratory might be in orbit. It is the considered opinion of scientists in this field, however, that prolonged weightlessness will most probably result in serious physiological or psychological problems for space travelers. It is, therefore, the accepted view that any space vehicle designed for prolonged space flight with its consequent condition of weightlessness must be designed to provide some system of producing an artificial gravity environment.

Furthermore, on space flights of extended duration, provision must be made for supplying the travelers during this period with food, a suitable atmosphere for breathing, and means for treating or disposing of waste. Up to the present, it has generally been contemplated that the entire requirements of food would be supplied from stocks loaded aboard the space vehicle on earth and that the supply of oxygen and treatment of the spaceship atmosphere would be accomplished by involved mechanical life support systems.

While various proposed designs for spacecraft incorporating systems for providing artificial gravity have been suggested, no spaceship design has been suggested in which the supply of food and the environment for supporting life has been maintained other than by involved mechanical systems which are quite subject to breakdown and which greatly increase the weight of the space vehicle and thus the amount of energy required. In addition, aside from the strictly mechanical problems involved with a spacecraft for extended duration flights, designs proposed up to the present time have been such that the living conditions for the travelers involved cramped quarters, difficulty in communication and in moving from one area of the spacecraft to another, and other limitations which would inevitably cause interpersonal problems to develop on flights of extended duration.

2. Description of the Prior Art

Various proposals have been suggested for dealing with the problem of weightlessness on extended space flights. One proposal suggests that inclusion of a centrifuge type of device within the space vehicle into which the occupants of the spaceship can enter at certain intervals of time and be subjected to artificial gravity forces. This approach requires a complex system and is of limited value. While possibly meeting some of the physiological problems involved in weightlessness, such an approach will certainly not solve the psychological difficulties of the space traveler who will be subjected to weightlessness over an extended period.

Another approach has been a spacecraft which will rotate about its center to generate centrifugal forces in a rim portion of a wheel-like structure or in the spokes of such a structure. In the case where a spoke-like section comprises the area where the astronauts would live, many previous designs envision differing levels within the spokes and thus each different level would be subjected to differing artifical G-forces and significant effort would be required in moving from the outermost level to the innermost level towards the hub portion of such a spaceship.

In U.S. Pat. No. 3,333,788 there is disclosed a spaceship comprised of two body sections which in orbit are extended from one another and maintained in connection with one another by cable structure and the two body sections are rotated about the center of gravity of the extended structure thus generating a centrifugal force to establish an artificial gravity in each section.

As indicated, previous spacecraft designed for extended voyages in space have failed to provide an artificial gravity environment in a simple manner free of impedimentary structure. In addition, such craft depend upon mechanical means for maintaining an earthlike atmosphere and for generating large amounts of electrical power, and require that the spacecraft be stocked from earth with expendables such as food sufficient for the entire duration of the space voyage. Little thought has been given in the past to the design of spacecraft which would provide an overall environment similar to that found on earth including plants, animals, soil, water circulation, sunlight, and weather patterns. Besides the physical deprivation resulting from the lack of such environment in a vehicle designed for extended voyages of months or years in space, such conditions because of the psychological stresses they cause are detrimental to the maintenance of social order among the travelers in the spacecraft.

SUMMARY OF THE INVENTION

The foregoing disadvantages and problems of the prior art space vehicles are alleviated by the present invention. According to this invention a space vehicle adapted to provide an artificial gravity and atmospheric environment for the occupants of the vehicle during extended voyages through space is provided. The space vehicle of this invention is of simple design which provides an artificial gravitational environment for the occupants and maintains an earthlike atmosphere by primarily natural processes. Utilizing the spacecraft of this invention, space travelers may live in a closed ecological system, growing their own food, disposing of the organic wastes and gaseous wastes by natural means, experiencing controlled weather conditions and "natural" ventilation.

The space vehicle according to this invention comprises a generally cylindrical shaped, hollow pressure-tight body provided with thrust generating means to rotate the body about its longitudinal axis. One end of the cylindrical body is at least slightly tapered and the opposite end is transparent to sunlight. Means are provided for controlling the loss of heat to space through radiation from the interior of the body by surface coatings such as reflective foils, paints, silvered surfaces or other surfaces known to those skilled in the art of insulation, on the body which maintain a differential in temperature between the end which is transparent to sunlight and the tapered end, the tapered end being the cooler end. High efficiency insulating materials on the interior walls may also be employed to control the heat loss from the body to space.

The temperature of the internal surfaces of the body at the tapered end is maintained below the dew point of water vapor in said body. Inwardly of the end of the body which is transparent to sunlight, means are provided for reflecting and deflecting sunlight from such transparent portion and distributing the sunlight to all of the internal surfaces of the body.

Due to the rotation of the spacecraft about its longitudinal axis, there is maintained an artificial gravity on the occupants and objects in the spacecraft along the walls of the body by centrifugal force. Along the longitudinal axis of the body the artificial gravitational force is zero. The space vehicle is provided with an initial supply of water vapor and oxygen to maintain human and other animal respiration, a supply of soil, chlorophyll-containing plants for food and the maintaining of the carbon dioxide/oxygen balance, and livestock, fish and fowl.

Due to the rotation of the body and the heat differential between the end having a transparent portion and the tapered end of the body, water vapor and other gases will flow towards the longitudinal axis of the body and from the warmer end to the cooler tapered end. The water vapor will condense against the internal surfaces of the body at the cold tapered end and then flow back towards the transparent end of the body along the walls.

The spacecraft is stocked with sufficient plant life to grow food for the voyagers. Growth is very rapid because of the constant sunlight. The presence of plant life also serves to maintain the oxygen/carbon dioxide balance in the atmosphere of the space vehicle. Preferebly sunlight is directed into the interior of the body through the transparent end by a reflecting mirror carried externally of the body which by a shaft and bearing with thrust means is maintained at an angle so as to be directed at the sun at all times. While the transparent end of the space vehicle may be directed at the sun and thus not require use of the mirror, this requires frequent adjustments and expenditures of energy to maintain the orientation of the vehicle axis of rotation during space flight.

The present invention provides a space vehicle suitable for extended space voyages which is virtually self-sustaining and requires very little complex machinery. The atmospheric circulation possible with the spaceship of the present invention is based upon utilization of a rotating heat pipe concept in which an elongated hollow chamber rotating along its longitudinal axis and containing a vaporizable inventory of liquid will set up an internal circulation pattern. If one end is heated, the liquid will vaporize and the vapor will flow toward the center of rotation and then axially to the colder end of the body and condense on the cool walls; and where the body is tapered towards the largest inside diameter, towards the warmer end. The condensed liquid will flow back to the warmer end by centrifugal force along, thus conpleting a liquid-vapor cycle. A constant weather pattern is established whereby warm air and water vapor from the warm end of the space vehicle flows inward towards the center and then towards a colder end of the space vehicle where it condenses out on the tapered body wall that is maintained below the dew point temperature. Then the liquid condensate and cool air flow outward from the center and along the slightly tapered wall of the inside surface back to the warm end. The spacecraft can maintain its own growing plant system which is capable of providing food, and maintaining a carbon dioxide/oxygen balance, as well as cycling or organic wastes.

BRIEF DESCRIPTION OF THE DRAWING

In the accompanying drawing

FIG. 1 is a perspective view of the spacecraft of this invention with the external wall partially cut away, showing the interior of the vehicle.

DESCRIPTION OF A SPECIFIC EMBODIMENT

In the accompanying drawing, the space vehicle of the present invention is shown generally at 2, in the form of a hollow, pressure tight cylindrical body 3 of generally bullet-like shape. The space vehicle 2 of this invention is provided with thrust-generating means 4 capable of rotating the space vehicle 2 about its longitudinal axis. Additional thrust-generating means 6 are provided at both ends of the vehicle for controlling the orientation of the axis of the vehicle normal to the plane of the ecliptic as well as providing additional thrust for rotation and propulsion. The end 9 of the vehicle 2 opposite the tapered end 8 is in the form of a generally flat surface 10 which is comprised of a plastic material 12 transparent to sunlight. While the end 9 may be ocnstructed integrally of plastic material 12, in the embodiment of the drawing it is comprised of multiple panes 14 of such plastic material 12 mounted in a frame 15 of structural members 16 which are secured to a centrally located plate member 18 at the center of the end 9 and to the internal surface of the walls 5 of the body 3. In the embodiment illustrated, the plate 18 carries a shaft 20 which has secured to it a bearing fixture 22 on which is mounted a large reflecting mirror 24 which rotates on the bearing 22 independently of the rotation of the space vehicle 2. The orientation of the mirror 24 is controlled by thrust-generating means 26 such as small rocket motors mounted on the periphery of the mirror 24 or by a small electric motor located on plate 18 so as to always be aimed towards the sun at an angle as shown by the dotted lines to reflect sunlight through the transparent material 12 of the panes 14 parallel to the longitudinal axis of the body 3. Inside of the end 9 of the vehicle about one-third the length of the body 3, concentric reflector/deflector rings 28 are mounted concentrically to each other and the longitudinal axis of the body 3 and secured to the wall 5 and each other by support members 32. The reflecting-/deflecting rings 28 are individually mounted at varying angles to the end 9, so as to reflect and deflect the sunlight in a criss-cross pattern throughout the interior of the space vehicle 2, the region near end 9 receiving the greatest intensity of sunlight, as shown by the dotted lines 33. As previously indicated, the space vehicle 2 is provided with an atmosphere of air necessary for supporting human respiration and plant life, as well as water. The walls 5 of the space vehicle 2 are insulated or coated in such a manner that the heat in the body 2 due to the sunlight is lost most rapidly at the tapered end 8 as indicated by heavy arrows 36 and at such a rate that the temperature of the interior of the walls 5 at the tapered end 8 is maintained below the dew point of the water vapor within the spacecraft 2 as well as lower than the temperature of the walls at the end 9 and central body portion. The temperature differential between the flat transparent end 9 and the tapered end 8 of the body 3 in conjunction with the rotation of the body 2 about its longitudinal axis causes the warm air and the water vapor from the region near the transparent end 9 to flow towards the central axis of the vehicle and towards the tapered end 8 where they impinge upon the cool walls of the vehicle. The water vapor condenses out as liquid water, and with the cool air flows back towards the warmer end 9 along the walls 5 of the vehicle. This circulation maintains a constant weather pattern in the interior of the space vehicle 2. The climate of the body vehicle 2 varies from tropical in the zone adjacent the end 9, to temperate in the central portion 30, to cool and moist at the tapered end 8 where condensation occurs.

If desired the reflecting/deflecting rings 28 may be mounted on the frame 16 which supports the transparent panes 14. In this case, the sunlight would strike the interior walls 5 of the vehicle at more oblique angles; however, construction would be simplified and the weight of the vehicle 2 less.

The space vehicle 2 is assembled in earth orbit and given an initial rotation to creat an artificial gravity force due to centrifugal forces against the curved walls 5 of the body. The space vehicle 2 is then provided with an initial inventory of air, water, soil 40, plants 42, animal life 44, and travelers 46.

Intensive cultivation of plants and food crops is possible since they are exposed to constant sunlight and controlled climate. The proper balance between plant and animal life is easily calculated and therefore stable oxygen, carbon dioxide and moisture cycles can be maintained. Means are provided for carefully processing human and other wastes so as to return them to the soil hygienically to serve as fertilizer for the plant life. The space vehicle is thus capable of maintaining an essentially independent colony of space travelers requiring from external sources only sunlight to maintain itself. A significant advantage of the spacecraft of this invention is the elimination of the need for a large amount of complex machinery to maintain an earthlike environment for the travelers. The environment of the spacecraft of the present invention is maintained essentially by natural forces sustained by the circulation of the heat and atmospheric gases according to the heat pipe concept. Mobility is very free in the spacecraft of this invention since all occupants are at substantially the same level of G-forces. No ducts or blowers for ventilation, lights or circuits for illumination, heaters and air conditioners for humidity and temperature control, water pumps and stills for water, nor complex waste disposal systems are required. Perhaps most importantly the spacecraft of the present invention which is designed for extended space travel of months and years and possibly for generations contains a pleasing earthlike outdoor environment for the occupants.

Maintaining the orientation of the space vehicle of this invention requires only a minimum amount of thrust power. The bulk of the spacecraft mass will rotate inertially with little need for realignment regardless of orbit or trajectory within roughly the plane of the ecliptic.

A typical space vehicle of this invention, designed to support approximately sixty people in space indefinitely, has the following design characteristics, based on the requirements of 2200 square feet per man to grow his entire requirements for food. The plant area required to maintain the air and water cycles is substantially less than this.

| | |
|---|---|
| Diameter, ft. | 150 |
| Length (of vehicle), ft. | 350 |
| Surface area, acres (sq. ft.) | 4 (175,000) |
| Window area, sq. ft. | 17,000 |
| Volume, cu. ft. | 600,000 |
| Pressure, psi (abs) | 5 |
| Weight of vehicle shell only, ton | 144 |
| Total weight without inventory, ton | 300 |
| Artificial gravity on walls, g | 3/8 |
| Rotation rate, rpm | 3.8 |

In summary then, the present invention provides a space vehicle having an artificial gravity effect on occupants and contents and provides the occupants with an earthlike atmosphere including controlled weather conditions, atmospheric balance of carbon dioxide and oxygen, and a natural means of growing food and disposing of wastes. Using the space vehicle of this invention, a group of space travelers would be able to sustain itself for many years possibly for generations with sunlight being he only continuously supplied external input. The spacecraft of the present invention contrasted to previously proposed craft for extended duration space travel is extremely earthlike and comfortable with the maintenance of most systems necessary for life sustained by natural means. For example, ventilation, air conditioning, temperature control, irrigation, illumination, waste disposal, including the reprocessing of carbon dioxide and nitrogenous excretions, are handled primarily by natural processes.

While the invention has been explained by a detail description of a specific embodiment, ,t is understood that various modifications and substitutions can be made within the scope of the appended claims which are intended to include equivalents of such embodiments.

What is claimed is:

1. A space vehicle adapted to provide an artificial gravity and atmospheric environment for occupants of the vehicle, said vehicle comprising a cylindrically shaped hollow pressure-tight body, a first end of said cylindrical body tapered from the largest diameter of said cylindrical body, thrust generating means mounted externally of said body for rotating said body about its longitudinal axis, a second end of said body, said second end transparent to sunlight, an atmosphere in said pressure tight body capable of sustaining human respiration and including water, means for controlling heat loss from said body at the tapered end of said body to thereby maintain the temperature of the internal walls of said body at said tapered end below the dew point of water vapor in said body, and at a temperature lower than that at the second end of said body, the temperature differential between said ends and the rotation of said body causing warm air and water vapor to flow from said second end towards said tapered end, centrally of said body, said water vapor being condensed on the tapered end walls, said water condensate and cool air then flowing outward from the central portion of the tapered end towards said second end along the wall of said body.

2. A vehicle as claimed in claim 1 including means within said body for deflecting and reflecting sunlight to disperse sunlight to the interior surfaces of said body.

3. A vehicle as claimed in claim 2 wherein said means for reflecting and deflecting said sunlight comprises reflective concentric louvred rings mounted about the longitudinal axis of said body.

4. A vehicle as claimed in claim 1 wherein said temperature differential is maintained by insulation on the walls of said body.

5. A vehicle as claimed in claim 4 wherein said temperature differential is maintained by insulation on the interior walls of said body and reflective surface coatings on the outer surface of said body.

6. A vehicle as claimed in claim 1 having means for directing sunlight through said transparent portion and parallel to the longitudinal axis of said body.

7. A vehicle as claimed in claim 2 wherein said means for directing sunlight comprises a mirror mounted on a shaft parallel to the axis of said body and external to said body at said second end, the orientation of said motor being independent of the rotation of said body normally facing the sun at an angle to direct sunlight through said transparent portion to the interior of said body and parallel to the longitudinal axis of said body.

8. A vehicle as claimed in claim 7 including means within said body for deflecting and reflecting sunlight to disperse sunlight to the interior surfaces of said body.

9. A vehicle as claimed in claim 8 wherein said means for reflecting and deflecting said sunlight comprises reflective concentric radially-spaced rings mounted about the longitudinal axis of said body, the surface of each ring being at an angle to said axis.

10. A vehicle as claimed in claim 9 wherein the interior walls of said vehicle are covered with soil and growing chlorophyll-containing plants are planted in said soil.

* * * * *